United States Patent [19]
Tsargorodski et al.

[11] Patent Number: 6,152,163
[45] Date of Patent: Nov. 28, 2000

[54] SWITCHING VALVE FOR MULTI-CHAMBER ADSORBENT AIR AND GAS FRACTIONATION SYSTEM

[75] Inventors: Mikhail Tsargorodski, Ocala; John E. Thelen, Dunnellow, both of Fla.

[73] Assignee: United Dominion Industries, Inc., Charlotte, N.C.

[21] Appl. No.: 09/065,796

[22] Filed: Apr. 23, 1998

[51] Int. Cl.[7] .......................... B01D 53/04; B01D 53/26; F16K 11/065

[52] U.S. Cl. .................. 137/240; 34/80; 96/116; 96/121; 137/309; 137/596.15; 137/596.18

[58] Field of Search .................. 137/309, 596.15, 137/596.16, 596.18, 240; 91/455; 96/111, 116, 117.5, 126, 121, 122, 117; 34/80, 82

[56] References Cited

U.S. PATENT DOCUMENTS

| | | | |
|---|---|---|---|
| 1,184,470 | 5/1916 | Matthews | 137/596.15 |
| 3,232,316 | 2/1966 | Carlisle | 137/596.15 |
| 3,258,899 | 7/1966 | Coffin | 96/114 |
| 3,364,943 | 1/1968 | Keller | 137/596.18 |
| 3,598,148 | 8/1971 | Kroffke | 137/596.16 |
| 3,603,348 | 9/1971 | Wright | 137/596.16 |
| 3,643,402 | 2/1972 | Wireman | 95/98 |
| 4,067,357 | 1/1978 | Ruchser | 137/596.15 |
| 4,083,381 | 4/1978 | McClocklin et al. | 137/596.15 |
| 4,247,311 | 1/1981 | Seibert et al. | 96/111 |
| 4,468,239 | 8/1984 | Frantz | 96/114 |
| 4,472,177 | 9/1984 | Sircar | 95/11 |
| 4,504,286 | 3/1985 | Carlisle et al. | 95/10 |
| 4,552,570 | 11/1985 | Gravatt | 95/10 |
| 4,559,065 | 12/1985 | Null et al. | 96/111 |
| 4,605,425 | 8/1986 | Verrando et al. | 95/10 |
| 4,754,693 | 7/1988 | Teltscher | 137/596.18 |
| 4,764,189 | 8/1988 | Yanagawa et al. | 96/114 |
| 4,891,051 | 1/1990 | Frantz | 96/114 |
| 5,114,441 | 5/1992 | Kanner et al. | 95/98 |
| 5,256,174 | 10/1993 | Kai et al. | 96/116 |
| 5,366,541 | 11/1994 | Hill et al. | 96/124 |
| 5,378,266 | 1/1995 | Elamin | 96/114 |
| 5,458,676 | 10/1995 | Herbst et al. | 96/109 |
| 5,715,621 | 2/1998 | Mitsch | 96/114 |
| 5,749,395 | 5/1998 | Hayashi et al. | 137/596.16 |

FOREIGN PATENT DOCUMENTS

| | | | |
|---|---|---|---|
| 2732773 | 2/1979 | Germany | 137/596.16 |
| 3421492 | 12/1985 | Germany | 137/596.16 |

*Primary Examiner*—George L. Walton
*Attorney, Agent, or Firm*—Kennedy, Covington, Lobdell & Hickman, LLP

[57] ABSTRACT

A unique switching valve for use with a multi-chamber adsorbent air and gas fractionation system for controlling the flow of fluid which comprises a valve housing including an inlet port, two outlet ports and an exhaust port and first valve and second valve members in the valve housing which are moveable between a first position and second position for alternately permitting and blocking fluid flow between the inlet port and the outlet ports and between the outlet ports and the exhaust port. The first and second valve members include mean for permitting a predetermined controlled flow of fluid between the inlet port and the outlet ports and means for permitting a predetermined controlled flow between the outlet ports and the exhaust port which simplify the design and control of the switching valve by eliminating the need for separate repressurization and depressurization valves. A multi-chamber adsorbent air and gas fractionation system utilizes the unique switching valve and comprises a pair of adsorption chambers adapted for air flow therethrough and periodic cycling between an adsorption cycle and a regeneration cycle where each chamber is alternately placed in communication with an inlet line which receives a pressurized air feed stream and an exhaust line maintained at a reduced pressure so that one chamber receives the pressurized air feed stream and is in the adsorption or drying cycle while the other chamber is simultaneously connected to the exhaust line and is in the reduced-pressure desorption or regeneration cycle.

42 Claims, 8 Drawing Sheets

SWITCHING VALVE FOR MULTI-CHAMBER ADSORBENT AIR AND GAS FRACTIONATION SYSTEM

BACKGROUND OF THE INVENTION

The present invention relates generally to gas separator systems and the like, and more particularly to an adsorbent fractionation system including a pneumatically operated four way switching valve for removing moisture from air streams.

Multi-chamber adsorbent air and gas fractionators are widely known for carrying out a process of separating gaseous mixtures. Some examples of this type of adsorbent fractionators are disclosed in U.S. Pat. Nos. 5,256,174, 4,468,239, 4,552,570,4,247,311 and 3,258,899. Multi-chamber adsorbent fractionators are commonly used for air drying and generally include two adsorbent beds which are adapted for periodic cycling between an adsorbing or drying cycle and a desorption or regeneration cycle. The adsorbent beds include a drying agent, such as desiccant beads or particles, for removing moisture from the air. The apparatus also includes an inlet line for receiving a pressurized air feed stream, an exhaust valve for exhausting desorbed gas, and flow control valves for directing the air flow between the inlet line and exhaust valve and the beds. In addition, the apparatus includes a control device for controlling the cycling time and switching the air flow in predetermined, periodic cycles to alternately place each of the desiccant beds in communication with the pressurized air flow from the inlet line and the exhaust valve.

In operation, the air feed stream to be dried is passed through the first bed which is maintained under the substantially relatively high pressure of the original air feed stream and the dried air is discharged at substantially the original air feed stream pressure. When the adsorptive capacity of the first bed is reached, the control device activates the flow control valves to switch he original air feed stream to the second bed and the air is cycled to the second bed while the first bed is simultaneously depressurized or placed on the regeneration or desorption cycle by opening one end of the exhaust valve to a region of relatively low pressure, such as atmospheric pressure. At the same time as pressure is reduced, a lower pressure purge air flow tapped from the dried air discharge is introduced as reflux into the first bed to pass over and through the desiccant material therein and purge the moisture from and regenerate the bed. After the first bed is regenerated and the adsorptive capacity of the second bed is reached, the control device activates the flow control valves to switch the original air feed stream to the first bed and the cycle begins again. Thus, the periodic switching of the flow passages connecting the desiccant beds to the inlet and exhaust lines causes a pressurized adsorption process and a reduced pressure desorption and regeneration process to be alternately carried out in each of the desiccant beds.

The cycling times for periodically switching the beds from the adsorption cycle to the regeneration cycle and back to the adsorption cycle may be fixed or variable, depending on the system use. The device for controlling cycling times for the periodic switching of the beds at a predetermined time may be a sequencer, a timer, a microprocessor, or the like. While the determination and control of the cycling time can be accomplished using several different control devices, the task of actually carrying out the interchange of flow between the beds and reversing the air flow from one bed to the other is typically handled by an array of flow control valves. The flow control valves typically include an inlet valve for each bed, an exhaust valve for each bed, a depressurization or dump valve and a repressurization valve. One disadvantage of this arrangement is that the plurality of separate valves increases the weight of the apparatus and the distances between the separate valves increase the likelihood of undesirable pressure drops within the apparatus. Another disadvantage is that failure in a single valve can result in the malfunction of the entire system. Further, if electrically operated valves are used, the frequent cycling in this type of apparatus will result in high energy costs and possible malfunction due to an electrical fault or power failure or low voltage. Thus, it is desirable to limit the number of valves while still providing a flow control valve system which effectively and reliably switches the beds between the adsorption and regeneration cycles.

Removal of moisture from the air feed stream depends upon several factors including the rate of flow of the stream, the rate of moisture adsorption and moisture content of the adsorbent, as well as the temperature and pressure of the air within the bed. While the bed in the drying cycle is maintained at a relatively high pressure for optimum adsorption, the purge or regeneration of the saturated desiccant bed is ordinarily carried out at a pressure lower than the pressure of the adsorption or drying cycle. In order to effectively regenerate the absorbent in the bed on the regeneration cycle, it is important to completely depressurize the bed. Lower pressure during the regeneration process can result in dryer regeneration which is more efficient because it dries air to a lower level to remove fluids and regeneration is more effective.

Each time a cycling occurs and there is a switch between the pressurized adsorption process and the reduced-pressure desorption regeneration, a bed is depressurized by venting through the exhaust valve to the atmosphere. While complete depressurization is important for optimum operation of the system, one problem with depressurizing is that if the air is released through the exhaust valve too quickly at a high fluidization velocity, it can result in a noisy blast. Further, the blast from the exhaust flow may result in the churning or vibration of the desiccant beads in the adsorbent bed being depressurized. Thus, the fluidization velocity must be maintained or the desiccant particles may be fluidized and destroy or reduce the adsorbent capabilities of the bed when it is switched to the drying cycle.

In prior art systems, a separate depressurization or dump valve is constructed to help limit exhaust flow exiting from the exhaust valve and reduce noise and sorbent bed churning and abrasion during depressurizing of the adsorbent bed. An example of this type of apparatus; including a dump valve can be seen in Seibert U.S. Pat. No. 4,247,311. Seibert '311 is directed to a dryer comprising a pair of desiccant tanks and including an inlet line for distributing an influent gas to inlet valves which control the flow of influent gas to the tanks. The apparatus also includes a pair of exhaust valves connected to the tanks through which purge flow is vented to the atmosphere. A feature of Seibert '311 is a dump or exhaust flow valve that regulates or limits exhaust flow from a sorbent bed that is vented through the exhaust valves. The dump valve comprises a coil spring valve exposed on one side to the gas pressure in one of the two tanks through the exhaust valves and to atmospheric pressure on the other side. The coil spring valve includes a critical orifice for bleeding gas past the valve when the valve is in the closed position for regulating or limiting exhaust flow through the dump valve. When the exhaust valves are open at one end to atmospheric pressure to reduce the pressure from the pressurized adsorption process to place the bed on the regeneration or desorption cycle, the coil spring under the resulting pressure differential thereacross is compressed to a closed position. Although the coil spring is in the closed position, limited exhaust flow may proceed through the orifice and the pressure differential therein gradually diminishes as the exhaust flow is vented. As the pressure differential diminishes below the pressure at which damage to the adsorbent bed can result, the spring gradually opens to permit flow through the coils.

While this type of coil spring valve works to regulate exhaust flow and reduce noise and sorbent bed churning, one disadvantage is that the coil spring is repeatedly subjected to tremendous pressures and the spring is prone to breaking. When the exhaust valves are opened to atmospheric pressure, the switch between the pressurized-adsorption bed and the reduced-pressure regeneration bed cause a tremendous force to slam on the spring as the exhaust flow rushes out from the exhaust valves. This occurs during each cycle and typically results in the spring breaking after a period of time. If the spring breaks, the coil spring valve does not close and the exhaust flow therethrough is not regulated or limited. Thus, the blast from the exhaust flow vented to the atmosphere is not controlled and may result in the churning or vibration of the desiccant beads in the adsorbent bed being depressurized and may destroy or reduce the adsorbent capabilities of the bed. If the adsorbent capabilities of the bed are reduced, the air feed stream is not effectively dried and the entire system is affected. Thus, a failure in the coil spring valve can result in the malfunction of the entire system and a reliable valve for controlling exhaust flow through the exhaust valves that is not prone to breaking is needed.

In addition, each time a cycling occurs and there is a switch between the reduced pressure desorption regeneration cycle and the adsorption cycle, a regenerated bed is repressurized by switching the air feed stream to the regenerated bed. One problem with repressurization of a bed is that if the air feed stream is introduced into the bed too quickly at a high fluid velocity, it can result in the churning or vibration of the desiccant beads in the adsorbent bed being repressurized. Thus, the fluidization velocity must be maintained or the desiccant particles may be fluidized and destroy or reduce the adsorbent capabilities of the bed. The necessary fluid velocity and maximum rate of air flow which can be introduced into the bed without disturbing the desiccant within the adsorbent bed is calculated using well known equations and methods. While the rate of the air feed stream can be controlled at its source, the switching of the beds from the regeneration cycle to the adsorption cycle causes a blast of pressurized air to enter the bed being repressurized, so that the air feed stream is introduced into the bed at a rate that is too high for maintaining the necessary fluid velocity therethrough. Prior art systems may include a separate repressurization valve that is constructed to reduce the rate of air flow to the bed being repressurized for a controlled repressurization time. However, one problem with these systems is that the separate valve adds weight and complexity to the system and the distances between the separate valves may increase the likelihood of undesirable pressure drops within the system. Another problem is that the repressurization valve is repeatedly subjected to the blast of air pressure upon the switching of the beds and is therefore prone to breaking. If the valve breaks, the repressurization time is uncontrolled and the pressurized air enters the bed at an undesirable high velocity rate which may destroy the desiccant beads of the adsorbent bed. Thus, the failure of the repressurization valve can result in the malfunction of the entire system.

In accordance with the present invention, a switching valve for a multi-chamber adsorbent air and gas fractionation system is provided which simplifies the design and control of the switching valve by eliminating the need for separate repressurization and depressurization valves while providing a reliable valve and an optimum drying system with a controlled repressurization time and controlled depressurization process.

SUMMARY OF THE INVENTION

In accordance with the present invention, a unique switching valve is provided for use with a multi-chamber adsorbent air and gas fractionation system for controlling the flow of fluid and this switching valve comprises a valve housing which has opposite ends and includes an inlet port, two outlet ports including a first outlet port and a second outlet port and an exhaust port. A first valve member in the valve housing is moveable between a first position, at which the valve member blocks communication between the inlet port and the first outlet port and permits fluid flow from the inlet port to the second outlet port, and a second position, at which the inlet port is in communication with the first outlet port and at which the valve member blocks fluid flow from the inlet port to the second outlet port, for alternately blocking and permitting communication between the inlet port and each of the first and second outlet ports. A second valve member in the valve housing is moveable between a first position, at which the valve member blocks fluid flow between the first and second outlet ports and the exhaust port, and a second position, at which at least one of the outlet ports is in communication with the exhaust port, for alternately blocking and permitting communication between the first and second outlet ports and the exhaust port. The second valve member is adapted to move from the first position to an intermediate position and includes a control element which permits a predetermined controlled flow of fluid between one of the outlet ports and the exhaust port at the intermediate position whereby the controlled fluid flow to the exhaust port is significantly less than the fluid flow to the exhaust port at the second position. The first valve member is also adapted to move from the first position to an intermediate position and includes a control element which permits a predetermined, controlled flow between the inlet port and the first and second outlet ports at the intermediate position whereby the controlled flow of fluid between the inlet port and the first and second outlet ports is significantly less than the fluid flow between the inlet port and the first and second outlet ports at the second position. Thus, the control elements of the first and second valves provide a controlled repressurization and depressurization of the fluid.

In the preferred embodiment of the present invention, the first and second valve members are moveable between the first and second positions in response to a pressure differential acting on the valve members and the switching valve includes a pressurizing device for applying a predetermined pilot air pressure to the first and second valve members. In response to the prevailing pressure differential across the valve members and the application of the predetermined pilot air pressure, the first and second valve members are alternately moveable between the first and second positions to alternately block and permit flow between the inlet port and one of the outlet ports while simultaneously alternately blocking and permitting communication between one of the outlet ports and the exhaust port. In the preferred embodiment, the control element of the second valve element comprises at least one orifice having a predetermined diameter which provides for limited flow between each of the outlet ports and the exhaust port through the orifice. The second valve member of the present invention comprises a pair of exhaust pistons positioned at each end of a rod and a pair of shuttles intermediately disposed between the exhaust pistons with each shuttle including the orifice which provides for the controlled flow. The shuttles are independently moveable relative to the exhaust pistons where one exhaust piston and the adjacent shuttle move together between the first position, at which the exhaust piston and shuttle block communication between one of the outlet ports and the exhaust port, and the second position, at which one of the outlet ports is in communication with the exhaust port. In operation, at the intermediate position, one exhaust piston moves from the first position to the second position while the adjacent shuttle remains in the first position, at which controlled flow between one of the outlet ports and the exhaust port is permitted through the orifice of the shuttle remaining in the first position. Each shuttle preferably includes a biasing element which has a predetermined biasing force which urges the shuttle at the intermediate position toward the second position so that both the exhaust piston and the adjacent shuttle are at the second position and one of the outlet ports is in communication with the exhaust port.

In the preferred embodiment, the control element of the first valve member comprises a passageway having a predetermined diameter and which is formed between the first valve member and the valve housing at the intermediate position for providing a controlled flow between each of the outlet ports and the inlet port for a controlled repressurization process. The first valve member of the present invention comprises a pair of coaxial inlet pistons mounted at each end of a rod and which are conjointly moveable between the first position and the second position. The pistons are mounted a predetermined distance from each other so that when one piston is at the first position and blocks communication between the inlet port and one of the outlet ports, the other inlet piston is at the second position and allows communication between the inlet port and one of the outlet ports. The valve housing includes a plurality of valve seats placed in interior recesses of the housing and a channel having a predetermined thickness. The valve seats are specifically configured to correspond to and engage one of the inlet pistons when the inlet piston is in the first position. In operation, at the intermediate position, the passageway comprises a clearance slot formed between one of the pistons and its valve seat for radial flow therethrough. The clearance slot is connected to the channel to provide controlled flow between the inlet port and each of the outlet ports.

The present invention may also include a multi-chamber adsorbent air and gas fractionation system utilizing a unique switching valve and comprises a pair of adsorption chambers adapted for air flow therethrough and periodic cycling between an adsorption cycle and a regeneration cycle where each chamber is alternately placed in communication with an inlet line which receives a pressurized air feed stream and an exhaust line maintained at a reduced pressure so that one chamber receives the pressurized air feed stream and is in the adsorption or drying cycle while the other chamber is simultaneously connected to the exhaust line and is in the reduced-pressure desorption or regeneration cycle. Each chamber includes a discharge line for discharging dried air from the chamber following the adsorption cycle of that chamber and a purge flow line for directing a lower pressure purge air flow from the discharge line of the chamber in the adsorbing cycle through the chamber in the regeneration cycle. While an air drying process is referenced herein, it will be understood that the fractionation system of the present invention is not limited to air drying and is useful in other applications, such as by way of example, oxygen generation, nitrogen generation, natural gas drying and air purification, and the feed stream may be a variety of gaseous mixtures for which separation of a particular component(s) therein is desired.

A feature of the system is the unique switching valve of the present invention for switching the air flow to alternately place each of the chambers in communication with the air feed stream from the inlet line and the exhaust line. The switching valve includes a valve housing having four connector ports which are connected to the inlet line, the two chambers and the exhaust line. The valve housing encloses an inlet valve and exhaust valve which include valve members or valve elements responsive to pressure differential thereacross and are moveable back and forth within said valve housing between a port open, end position and a port obstructing, closed position according to the pressure differential therein at various stages of the adsorption and regeneration cycles for directing the air flow between the inlet line and one of the chambers and the exhaust line and the other chamber. The switching valve is uniquely designed to provide means for controlled repressurization time and depressurization process without requiring additional valves to be added to the system. The inlet valve includes the repressurization means and is provided by the assembly of a pair of the valve elements within the valve body so that when one of the valve elements is at the port open position, the other valve element makes calibrated clearance with the valve body for controlling the air feed stream to one of the chambers for providing controlled repressurization. The exhaust valve includes the depressurization means and is provided by valve elements including a pair of orifice spring biased shuttles moveable in response to the pressure differential thereacross and having at least one through hole in each shuttle with a diameter sized to provide a predetermined flow of air therethrough when the orifice shuttle is in the port obstructing position for providing a controlled depressurization process when the exhaust valve is open and the chamber in communication with the exhaust valve is placed on the regeneration cycle.

The multi-chamber adsorbent air and gas fractionation system of the present invention includes a pressurizing means for applying a predetermined amount of pilot air pressure to the switching valve for overcoming the prevailing pressure differential across the inlet and exhaust valves to move the valve elements to the port obstructing or port open positions to alternately place the adsorption chambers in communication with the inlet line and the exhaust line according to the application of pilot air pressure. The system also includes a control means for controlling the pressurized means for switching the air flow in predetermined, periodic cycles to alternately place each of the chambers in communication with the air feed stream from the inlet line and the exhaust line. The control means for controlling the periodic cycling interchanging the chambers may be a control device, such as, by way of example, a microprocessor. A fixed or variable time cycle can be imposed by a mechanical, pneumatic, electrical timing device or by a microprocessor. The system further includes a conventional purge flow means, such as a purge flow valve comprised of a combination of check valves and orifices, for determining the rate of purge flow through the purge flow line and introduction of lower pressure dried air purge flow to the bed being regenerated.

DESCRIPTION OF THE PREFERRED EMBODIMENT

Figure 1:
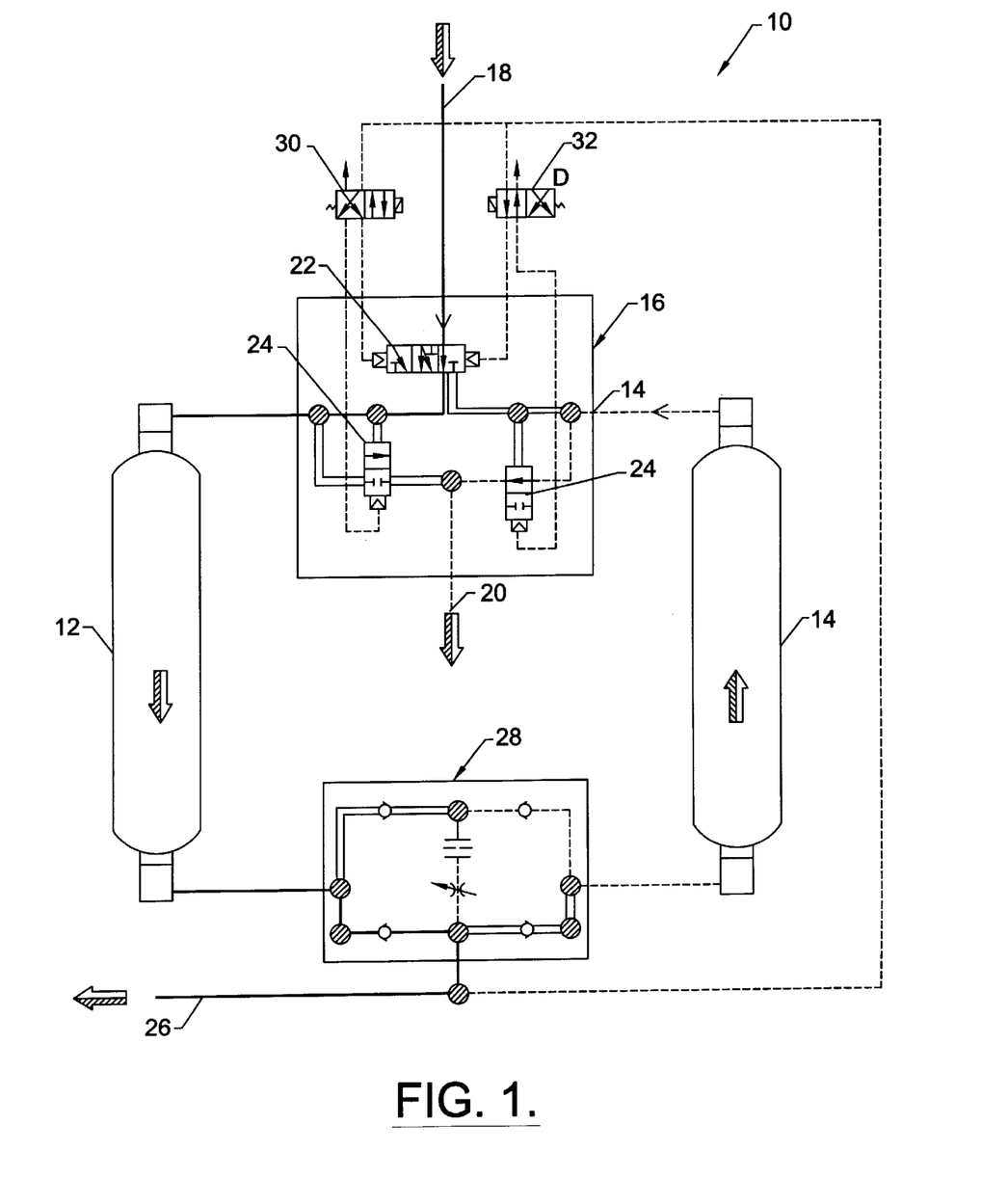
FIG. 1 is a schematic of the multi-chamber adsorbent air and gas fractionation system including a first and second chamber and a switching valve.

Looking now in greater detail at the accompanying drawings, FIG. 1 illustrates a multi-chamber adsorbent air and gas fractionation system 10 including a pair of adsorbent chambers 12, 14 having a drying agent or desiccant within the chambers, a switching valve 16 for periodic cycling of the chambers 12, 14 between an adsorption or drying cycle and a desorption or regeneration cycle, an inlet line 18 for receiving a pressurized wet fluid stream and an exhaust line 20 for exhausting desorbed fluid. While the present invention has many applications, such as but not limited to, oxygen generation, nitrogen generation, natural gas drying and air purification, the description herein will be for drying air. The switching valve 16 includes a first valve member 22 and a second valve member 24 for directing the air flow between the inlet line 18 and the chambers 12, 14 and between the chambers 12, 14 and the exhaust line 20. As shown in FIG. 1, the system 10 also includes a discharge line 26 for discharging dried air from each chamber 12, 14 a purge flow valve 28 for introducing dried air from one chamber at a reduced pressure, as reflux to the other chamber and a pressurizing means. The pressurizing means shown is valves 30, 32 which are preferably solenoid valves and apply a predetermined pilot air pressure to the first and second valve members 22, 24 for switching the air flow in predetermined periodic cycles to alternately place the chambers 12, 14 in communication with the inlet line 18 and the exhaust line 20. The pressurizing means is controlled by a control means or device, such as a sequencer, timer, microprocessor or the like, and is preferably a microprocessor.

Figure 2:
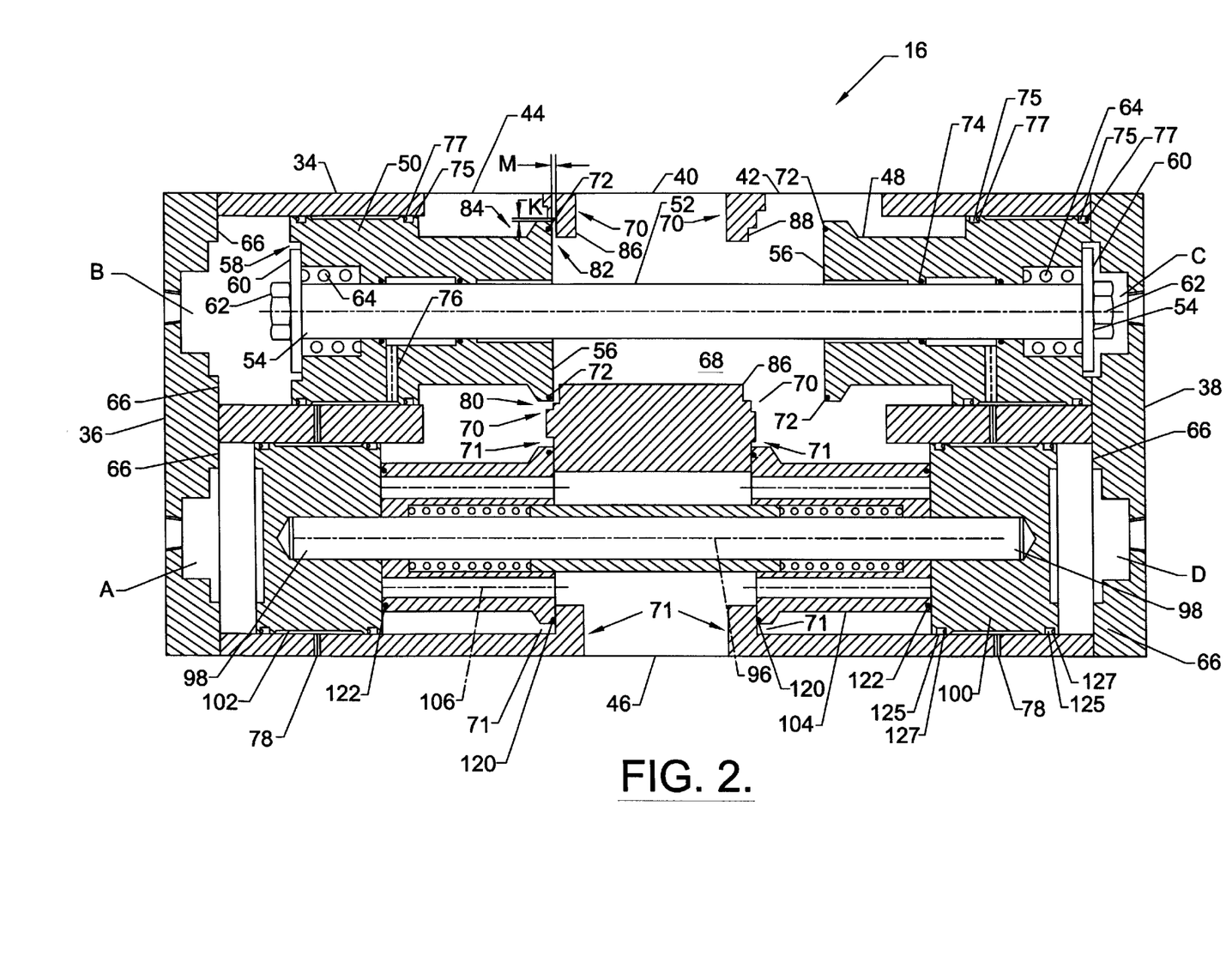
FIG. 2 is cross sectional view of the switching valve showing the initial position of the switching valve when the second chamber is in the drying cycle and the first chamber is under controlled repressurization.
Figure 3:
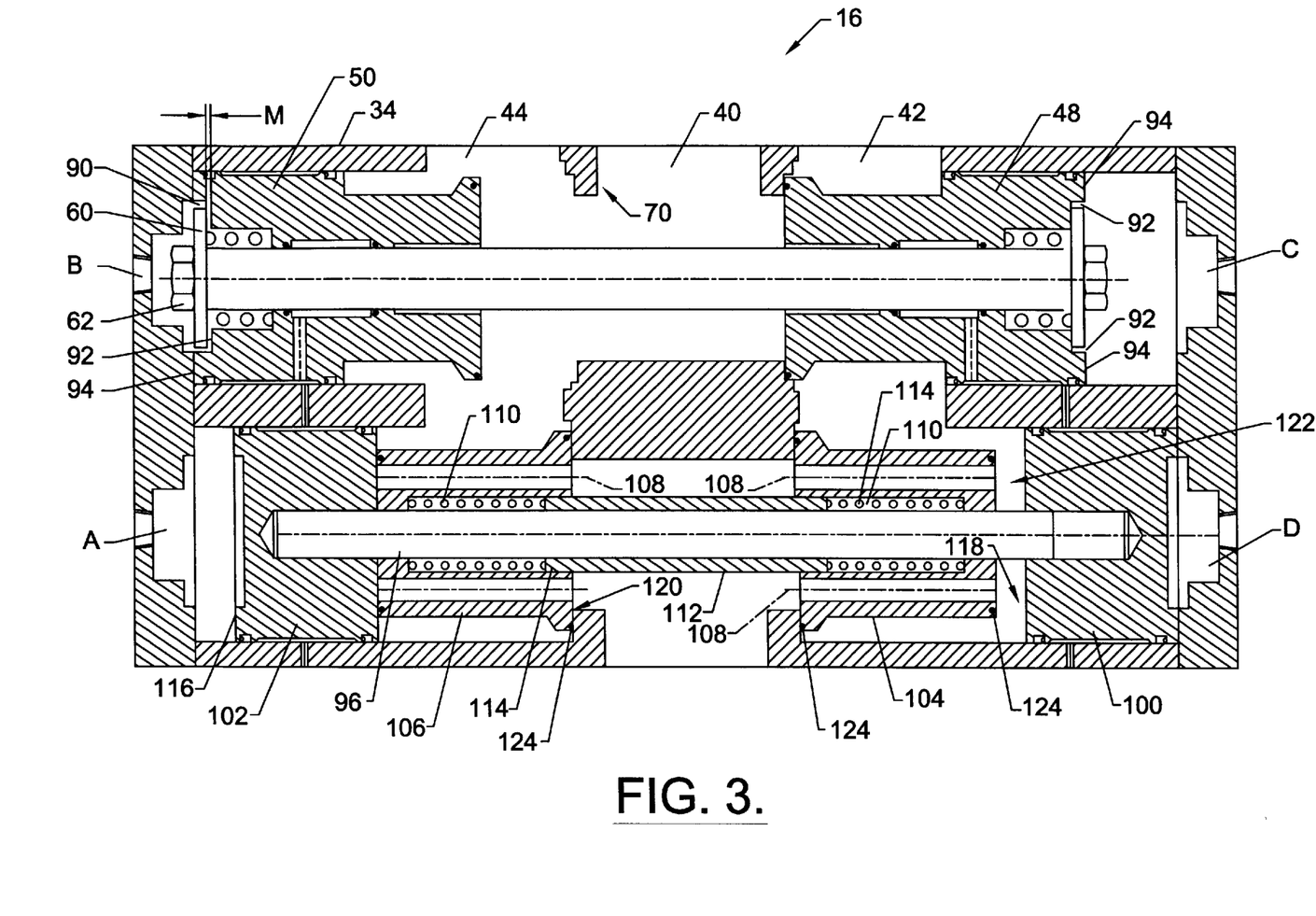
FIG. 3 is a cross sectional view of the switching valve showing the next position, following the position shown in FIG. 2, when the first chamber is in the drying cycle and the second chamber is under controlled depressurization in the regeneration cycle.
Figure 6:
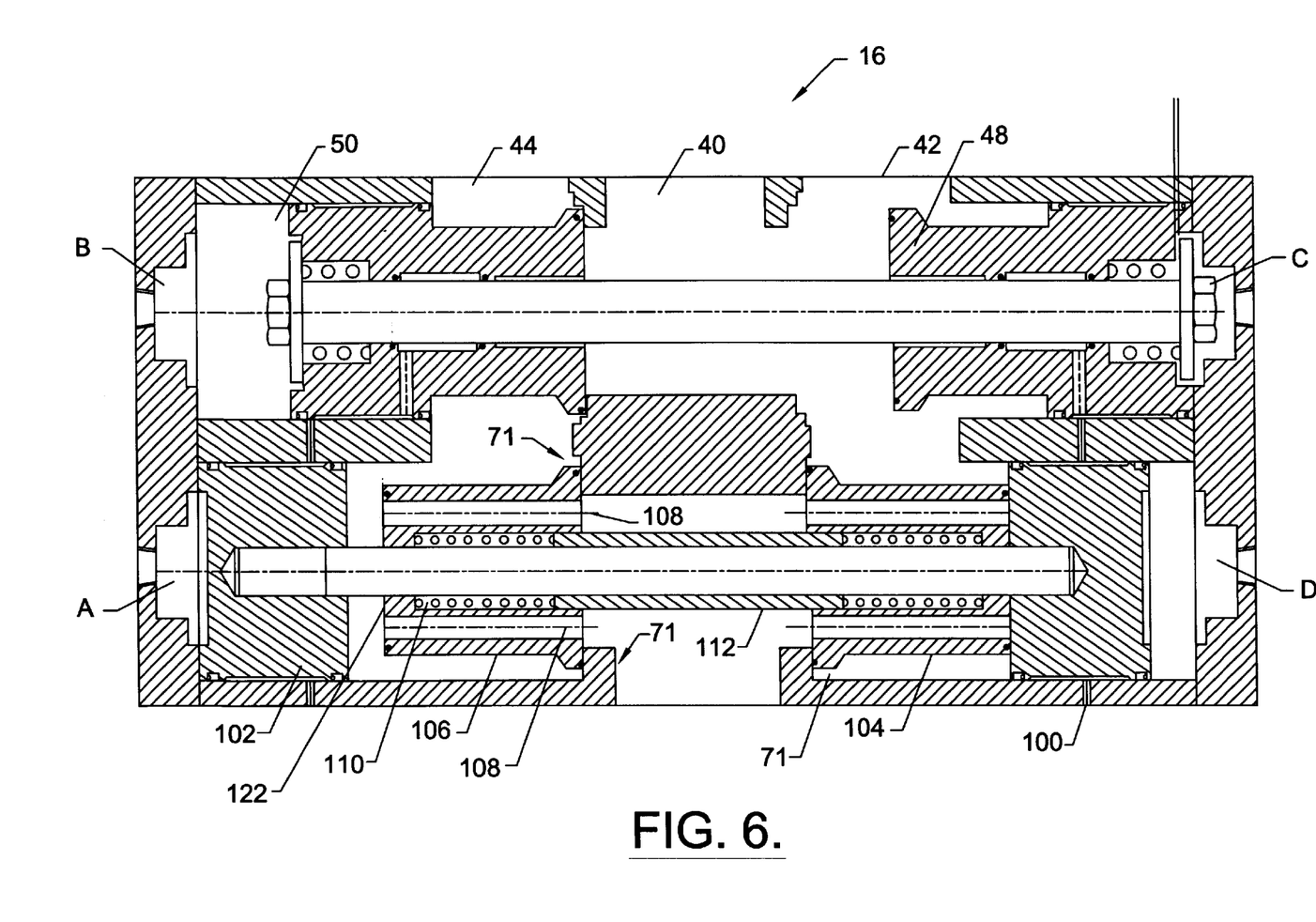
FIG. 6 is a cross sectional view of the switching valve showing the next position, following the position shown in FIG. 5, when the second chamber is in the drying cycle and the first chamber is under controlled depressurization in the regeneration cycle.
Figure 7:
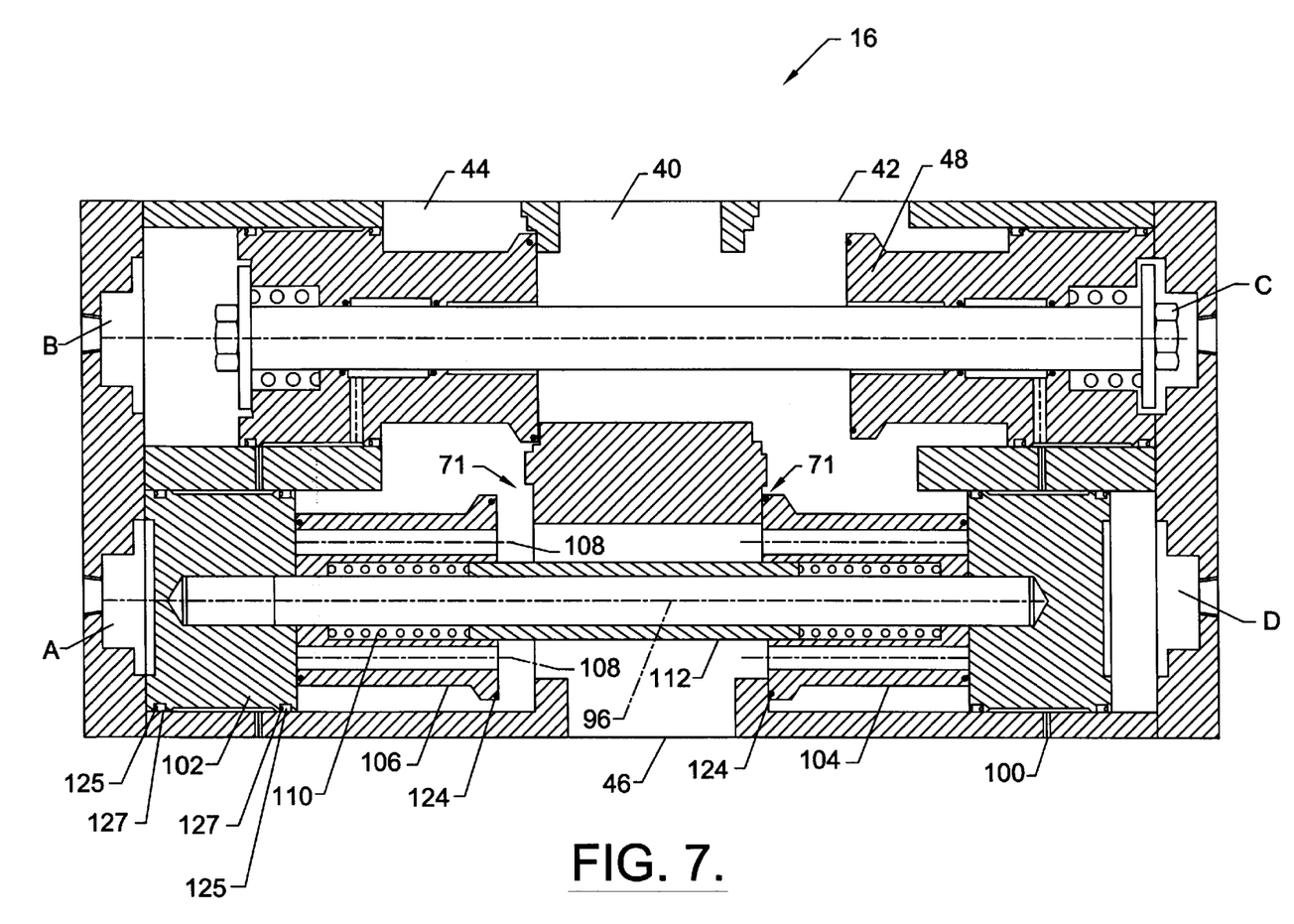
FIG. 7 is a cross sectional view of the switching valve showing the next position, following the position shown in FIG. 6, when the second chamber is in the drying cycle and the first chamber is completely depressurized in the regeneration cycle.
Figure 8:
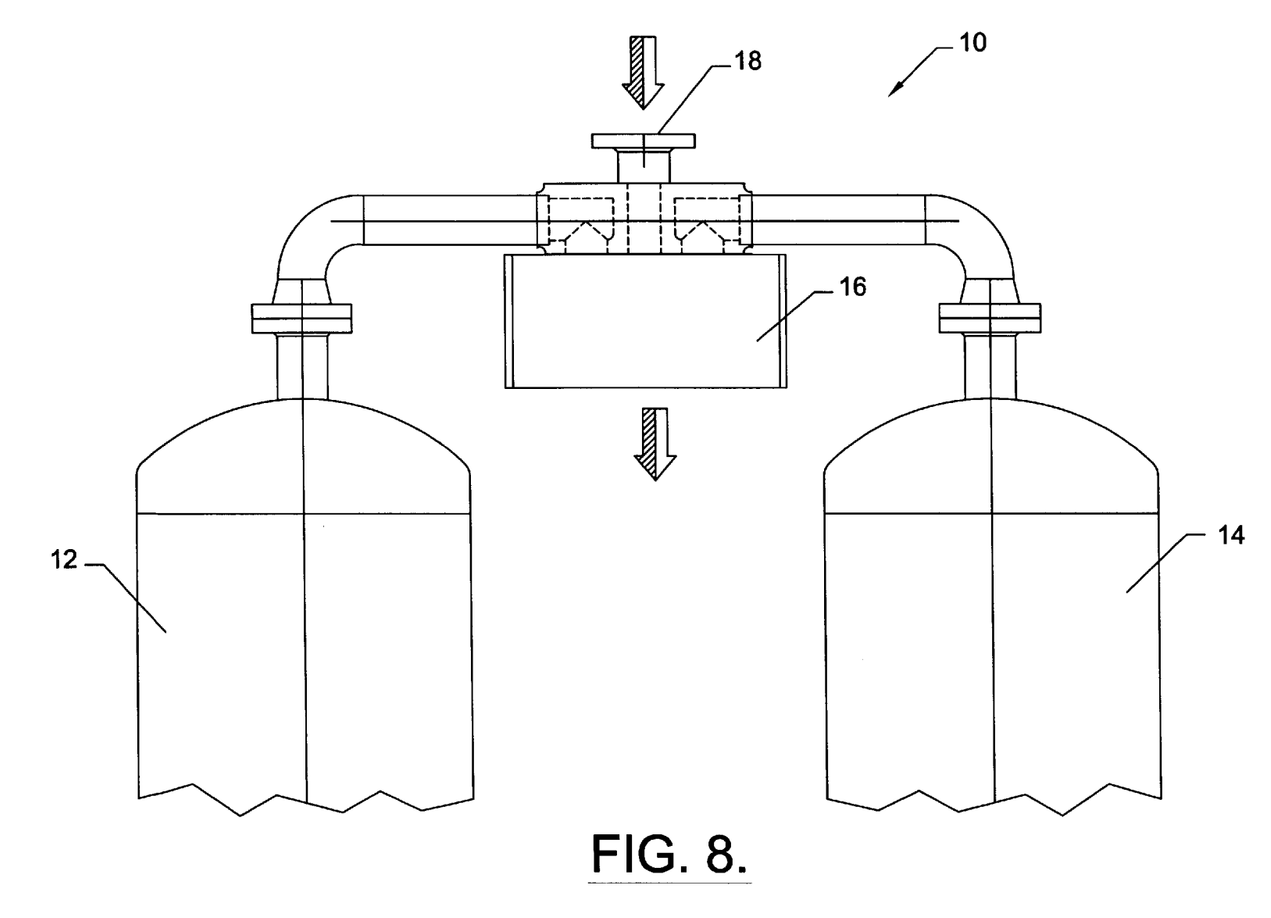
FIG. 8 is a perspective view of the top of the desiccant chambers and the valve housing of the switching valve.

FIGS. 2–7 illustrate the preferred embodiment of the switching valve 16 which includes a valve housing 34 having opposite ends 36, 38, an inlet port 40 for receiving the wet air stream, first and second outlet ports 42, 44 which are connected to the chambers 12, 14, an exhaust port 46 and the first and second valve members 22, 24. FIG. 8 illustrates the top of each desiccant chamber 12, 14 connected to the switching valve housing 34. While the first and second valve members 22, 24 may be actuated by any suitable means, including but not limited to mechanical or electrical means, the valve members of the preferred embodiment move in response to pressure differential and the valve housing 34 includes pilot air pressure chambers A, B, C and D at opposite ends 36, 38 of the housing 34 for applying pilot air pressure to the first and second valve members 22, 24 to alternately switch the flow of air between the one adsorbent chamber 12 to the other adsorbent chamber 14. The first valve member 22 includes a pair of coaxial inlet pistons 48, 50 mounted at each end 54 of a rod 52. The inlet pistons 48, 50 are conjointly moveable back and forth between the first position and the second position and are mounted a predetermined distance from one another on the rod 52 so that when one inlet piston 48 is at the first position which blocks communication between the inlet port 40 and the first outlet port 42, the other piston 50 is at the second position which permits communication between the inlet port and the second outlet port 44 as shown in FIG. 3. Each inlet piston 48, 50 has an inner face 56 and an outer face 58 which is adjacent to the ends 36, 38 of the valve housing 34. The first valve member also includes a washer assembly at each end 54 of the rod 52. The washer assembly includes a washer 60 adjacent to the outer face 58 of each inlet piston and a nut 62 adjacent to the washer 60 for maintaining the washer 60 and pistons 48, 50 in place. The washer 60 at each end 54 are mounted on the rod 52 a predetermined distance from each other. The inlet pistons 48, 50 may also include a compression spring 64 positioned between the washer 60 and the outer face 58 of the inlet pistons 48, 50. Each end 36, 38 of the valve housing 34 defines a stop 66 for engaging the outer face 58 of each inlet piston to stop movement of the piston when it is at the second position. The valve housing 34 also includes interior recesses 68 and a plurality of inlet valve seats 70. The inlet valve seats 70 are specifically configured to correspond to and engage the inner face of each inlet piston 48, 50 when the piston is in the first position. The inner face 56 of each piston 48, 50 preferably includes a resilient face member 72 which seals the inlet pistons 48, 50 against the corresponding inlet valve seats 70 when the inlet piston is firmly seated at the first position and a resilient rod sealing member 74 mounted between the inlet piston 48, 50 and the rod 52 to provide a seal between the inlet piston 48, 50 and the rod 52. Each inlet piston 48, 50 may include seals 75 in recesses 77 to seal off the pilot air chambers B and C from the interior recesses 68 of the valve housing 34. Each piston 48, 50 may further include a through hole or radial hole 76 in the piston and the valve housing 34 may include a drain hole 78 for preventing wet air with desiccant dust from leaking through the seals 75 or the resilient rod sealing member 74 to the pilot air chambers B and C. The radial hole 76 and drain hole 78 also serve as indicators of the condition of the seals 75 and rod sealing member 74.

Figure 5:
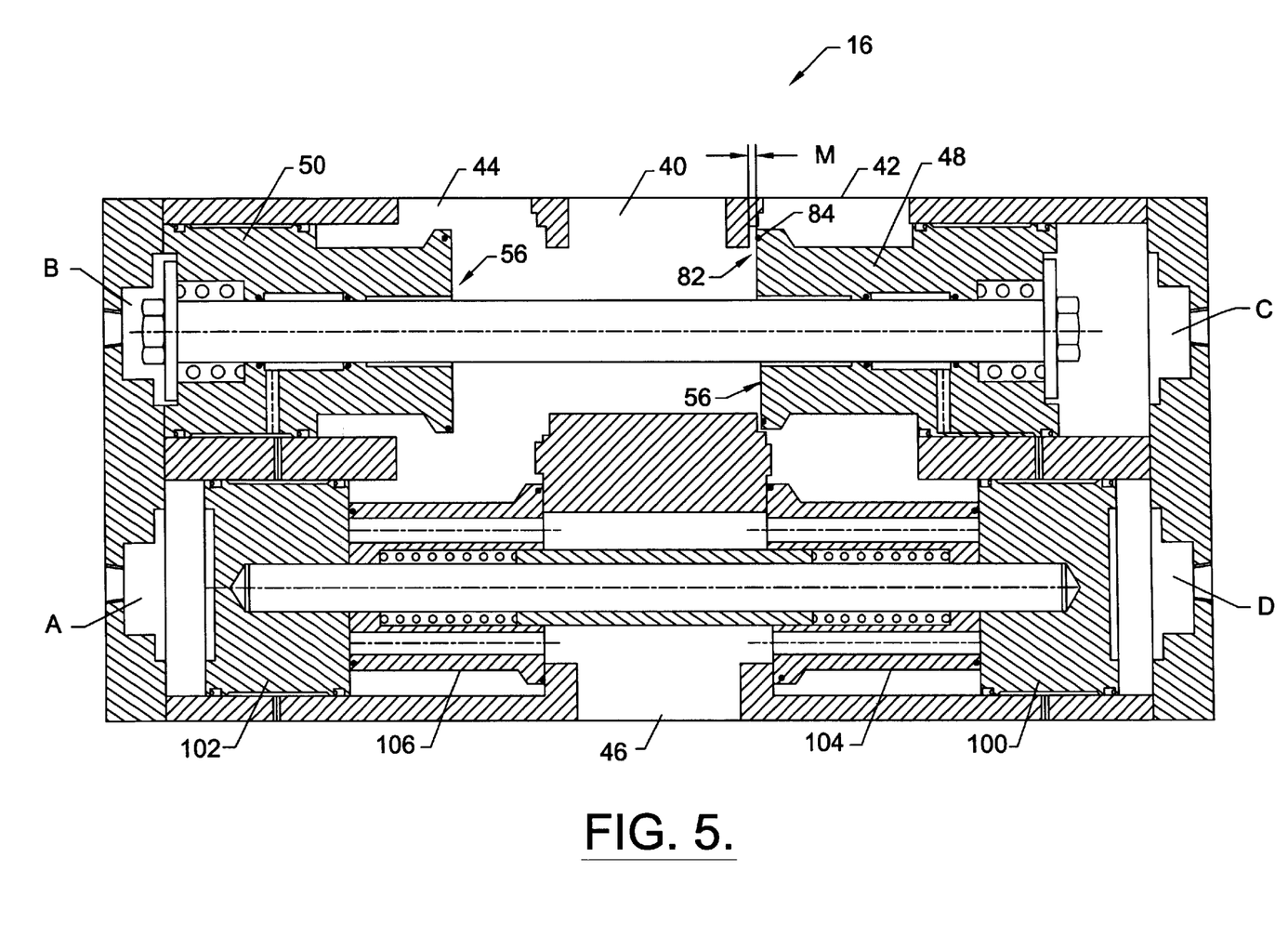
FIG. 5 is a cross sectional view of the switching valve showing the next position, following the position shown in FIG. 4, when the second chamber is under controlled repressurization following the regeneration cycle and the first chamber is in the drying cycle.

In the preferred embodiment, the inlet pistons 48, 50 are adapted to move sequentially from the first position to an intermediate position and to the second position, and the first valve member 22 includes a means for providing a predetermined controlled flow of air between the inlet port 40 and the first and second outlet ports 42, 44 when one of the inlet pistons 48, 50 is at the intermediate position. The means provides for a fluid flow between the inlet port 40 and the first and second outlet ports 42, 44 which is significantly less than the fluid flow between the inlet port 40 and the first and second outlet ports 42, 44 when the inlet pistons 48, 50 are at the second position. The means for providing a predetermined controlled flow of air comprises a passageway 80 formed between the inlet pistons 48, 50 and the corresponding inlet valve seats 70 when the inlet pistons 48, 50 are at the intermediate position which provides a calibrated clearance between the pistons 48, 50 and the valve housing 34 at the intermediate position for a controlled repressurization. As best seen in FIGS. 2 and 5, the passageway 80 includes a channel 82 and a clearance slot 84. The channel 82 has a predetermined width M and is formed between a lower portion 86 of the inlet valve seat 70 and inner face of one piston 48, 50 at the intermediate position. The clearance slot 84 has a predetermined diameter K and is formed between the outer diameter of the inner face 56 of one piston 48, 50 at the intermediate position and a side portion 88 of the inlet valve seat 70. At the intermediate position, the channel 82 is formed and the clearance slot 84 is connected to the channel to defined the passageway for providing controlled flow between the inlet port 40 and the first and second outlet ports 42, 44.

In the preferred embodiment, the first valve element includes an outer channel 90 having the same predetermined width M as the channel 82. As shown in FIGS. 3, 4, 6 and 7, the outer channel 90 is formed between the outer face 58 of the inlet piston and the washer 60 of one piston 48 in the second position when the other piston 50 is at the first position. The outer face 58 of each inlet piston 48, 50 includes an inner recessed portion 92 and an outer, stop engaging portion 94 and the piston is moveable relative to the washer 60 between a contact position at which the inner portion 92 of the outer face 58 of one inlet piston 48 is in contact with the washer 60 and a spaced position at which the inner portion of the outer face of the inlet piston 50 is a predetermined distance from the washer 60. When one piston 48 is firmly seated at the valve seat 70 in the first position and the other piston 50 is at the second position, the washer 60 and piston are at the spaced position to form the outer channel 90. At the intermediate position, the washer 60 and piston are in the contact position and the outer channel 90 is eliminated and the channel 82 is formed and connected with the clearance slot 84 to provide the passageway 80.

The second valve element 24 of the preferred embodiment includes a rod 96 having opposite ends 98, a pair of exhaust pistons 100, 102 which are moveably mounted at each end 98 of the rod 96 and a pair of shuttles 104, 106 which are intermediately disposed between the exhaust pistons 100, 102 and independently moveable relative to the exhaust pistons 100, 102. The exhaust piston 100 and the adjacent shuttle 104 and the other exhaust piston 102 and the adjacent shuttle 106 are correspondingly moveable between the first position at which the exhaust pistons 100, 102 and the adjacent shuttles 104, 106 are aligned to block communication between the outlet ports 42, 44 and the exhaust port 46 and the second position at which one of the outlet ports is in communication with the exhaust port 46. In the preferred embodiment, the exhaust pistons 100, 102 and adjacent shuttles 104, 106 are adapted to move sequentially from the first position to an intermediate position and to the second position, and the second valve member includes a means for permitting a predetermined controlled flow of air between the one of the outlet ports 42, 44 and the exhaust port 46 when one of the exhaust pistons 100, 102 and the adjacent shuttle 104 or 106 at the intermediate position. The means provides for a fluid flow between one of the outlet ports 42, 44 and the exhaust port 46 which is significantly less than the fluid flow between one of the outlet ports 42, 44 and the exhaust port 46 when the exhaust pistons 100, 102 are at the second position. The means for permitting a predetermined controlled flow of air comprises at least one orifice 108 having a predetermined diameter for providing limited flow therethrough when one of the exhaust pistons 100, 102 and the adjacent shuttles 104, 106 is at the intermediate position for a controlled depressurization process.

As shown in FIGS. 2–7, the orifice 108 extends through each shuttle 104, 106 and each shuttle also includes a biasing means, such as spring 110, having a predetermined biasing force for urging the shuttles 104, 106 toward the second position at which there is unrestricted communication between one of said outlet ports 42, 44 and the exhaust port 46. The second valve member 24 also includes a spacing element 112 which has opposite ends 114 and is counted on the rod 96 between the shuttles 104, 106 and has each end 114 in contact with the spring 110 of each shuttle 104, 106. Each exhaust piston 100, 102 includes an outer face 116 adjacent to the ends 36, 38 of the valve housing 34 and an inner face 118 adjacent to one of the shuttles 104, 106 intermediately disposed therein and each shuttle 104, 106 includes an inner face 120 and an outer face 122 which is adjacent to the inner face 118 of the exhaust pistons 100, 102 disposed on each end 98 of the rod 96. The inner faces 120 and outer faces 122 include a resilient member 124 on the faces 120, 122 to provide a seal at exhaust valve seats 71 and at the adjacent exhaust piston 100, 102 when the shuttles are at the first position and at the second position. A plurality of exhaust valve seats 71 placed in the interior recesses of the valve housing 34 which are specifically configured to engage the inner faces 120 of each of the shuttles 104, 106 when the shuttles 104, 106 are at the first position. Opposite ends 36, 38 of the value housing 34 include stop 66 for engaging the outer faces 116 of the exhaust pistons 100, 102 to stop movement of the exhaust pistons 100, 102 when the exhaust piston is at the second position. At the intermediate position, one of the exhaust pistons 100, 102 moves to engage the stop 66 while the inner face 120 of the adjacent shuttle continues to engage the exhaust valve seat 71. Each exhaust piston 100, 102 may include seals 125 and recesses 127 to seal off the pilot air chambers A and D from the interior recesses 68 of the valve housing 34. The diameter of the orifice 108 extending through each of the shuttles 104, 106, the dimensions of resilient members 124 on the faces 120, 122, and the biasing force of the spring 110 are selected so that the inner face 120 of the adjacent shuttle remains against the exhaust valve seat 71 at the intermediate position to permit flow through the orifice 108 of the shuttle for a controlled depressurization that provides for dumping the pressure at a predetermined level.

FIGS. 2–7 illustrate the position of the first valve member 22 and the second valve member 24 in operation during one complete cycle in which the air flow is switched to alternately place each of the desiccant chambers 12, 14, shown in FIG. 1, with chamber 12 now identified as the left chamber and chamber 14 now identified as the right chamber, in communication with the pressurized air flow from the inlet port 40 for an adsorption or drying cycle and the exhaust port 46 for a desorption or regeneration cycle.

Figure 4:
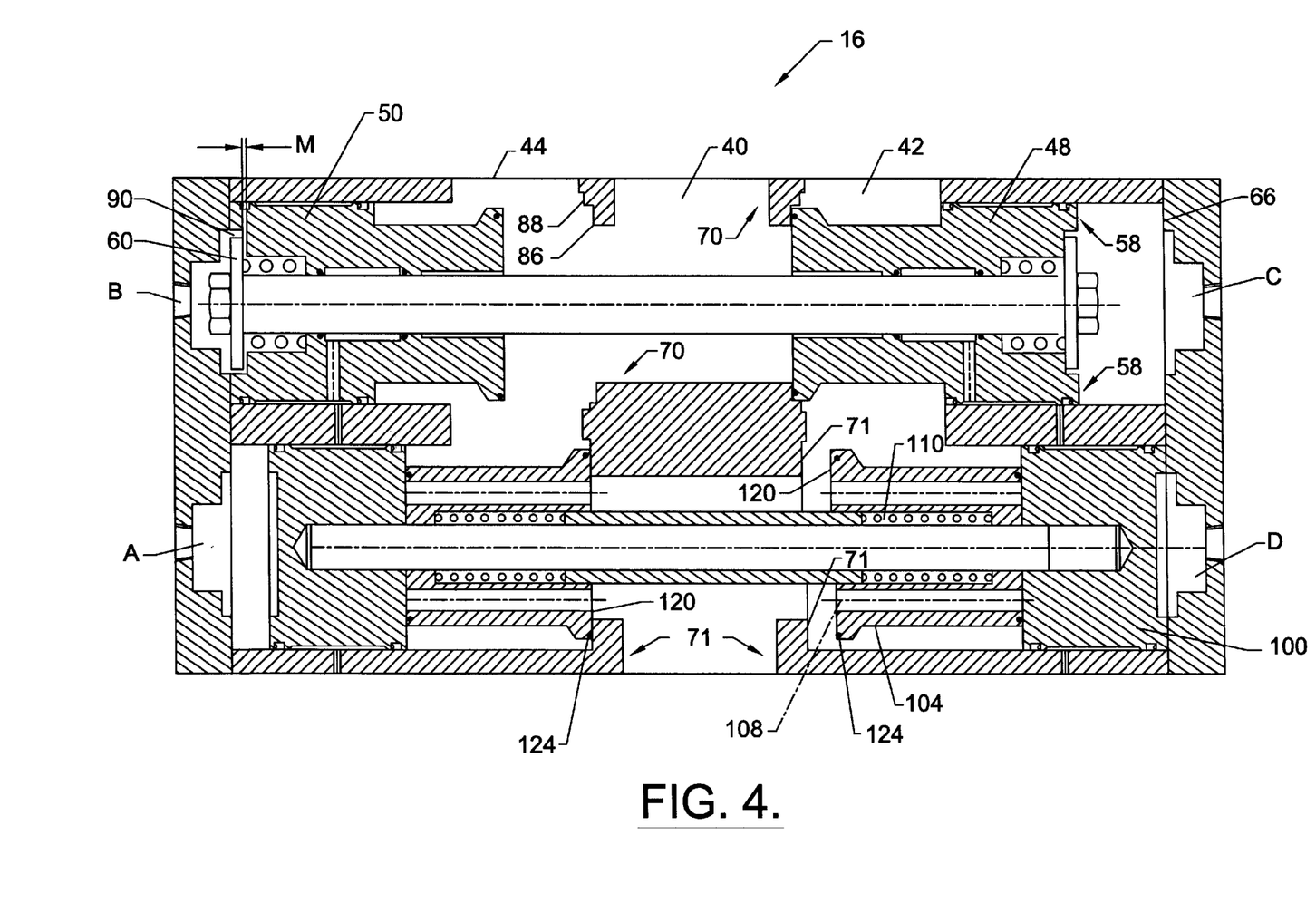
FIG. 4 is a cross sectional view of the switching valve showing the next position, following the position shown in FIG. 3, when the first chamber is in the drying cycle and the second chamber is completely depressurized in the regeneration cycle.

FIG. 2 illustrates the switching valve 16 during the repressurization process when the pilot air chambers A and D are under pilot air pressure and the exhaust pistons 100, 102 and shuttles 104, 106 are in the first position blocking flow to the exhaust port 46 in response to the pressure differential thereacross and when pilot air chambers B and C are opened to atmospheric pressure and the inlet piston 48 is at the second position providing communication between the inlet port 40 and the first outlet port 42 and the inlet piston 50 is at the intermediate position. FIG. 3 illustrates the next position of the first and second valve members 22, 24 during the cycle in which the left chamber is drying and the right chamber is depressurizing when pilot air chambers A and C are under pilot air pressure so that the outer face of inlet piston 48 receives such pressure and the inlet piston 48 is at the first position blocking communication between the inlet port 40 and the first outlet port 42 and the other piston 50 is at the second position allowing communication between the inlet port 40 and the second outlet port 44 and an outer channel 90 having a predetermined width M is formed between the washer 60 and the outer face 58 of the inlet piston 50 at the second position. FIG. 3 also shows that at the same time, pilot air chambers B and D are opened to the atmosphere and one exhaust piston 100 and the adjacent shuttle 104 are at the intermediate position with the exhaust piston 100 at the second position while the shuttle 104 remains at the first position against the exhaust valve seat 71 to permit a controlled flow of air between the first outlet port 42 and the exhaust port 46 through the orifice 108 of the shuttle. When the pressure acting across the exhaust valve member drops to a predetermined level, spring 110 overcomes the air pressure holding the shuttle 104 in the first position and moves to the second position dumping the rest of the pressure through the exhaust port 46 as shown in FIG. 4. FIG. 5 illustrates the next position of the switching valve 16 during repressurization when pilot air chambers B and C are opened to the atmosphere and pilot air chambers A and D are under pressure. With pilot air pressure in chambers A and D, the exhaust pistons 100, 106 and shuttles 104, 106 move to the first position to block communication between the second outlet port 42, and the exhaust port 46. Simultaneously, the outer channel 90 having a width M adjacent to the inlet piston 50 at the second position is taken up and the inlet piston 48 moves to the intermediate position at which the channel 82 having a width M is formed between inner face of the piston and the inlet valve seat 70 and is connected to the clearance slot 84 formed between the valve seat and the outlet diameter of the inner face of the piston so that air flows from the inlet port 40 to the first outlet port 42 through the passageway formed by the channel 82 and the clearance slot 84. FIG. 6 illustrates the next position of the switching valve 16 in which the right chamber is drying and the left chamber is depressurizing when pilot air chambers B and D are under pilot air pressure so that the outer face of one inlet piston 50 receives such pressure and the inlet piston 50 is at the first position blocking communication between the inlet port 40 and the second outlet port 44 and the other piston 48 is at the second position allowing communication between the inlet port 40 and the first outlet port 42 and an outer channel 90 having a predetermined width M is formed between the washer 60 and the outer face 58 of the inlet piston 48 at the second position. FIG. 6 also shows that at the same time, pilot air chambers A and C are opened to the atmosphere and one exhaust piston 102 and the adjacent shuttle 106 are at the intermediate position with the exhaust piston 102 at the second position while the shuttle 106 remains at the first position against the exhaust valve seat 71 to permit a controlled flow of air between the second outlet port 44 and the exhaust port 46 through the orifice of the shuttle 106. When the pressure acting across the exhaust valve member drops to a predetermined level, spring 110 overcomes the air pressure holding the shuttle 106 in the first position and shuttle 106 moves to the second position dumping the rest of the pressure through the exhaust port 46 as shown in FIG. 7.

EXAMPLE

Test results have shown that a multi-chamber adsorbant air and gas fractionator of the type shown in FIG. 1 may be used to dry an air feed stream at 80% relative humidity, 100 degrees F and 100 p.s.i.g. inlet pressure with a superficial flow velocity of the air set at 80 feet per minute. In this test, the fractionator included two desiccant chambers 60 inches long and 8 inches in diameter, each chamber containing 86 lbs of activated alumina. The first chamber repressurized in about 7 seconds and remained on stream drying the air for a total of 180 seconds. The second chamber depressurized completely in about 12 seconds and remained in the regeneration mode for a total of 180 seconds.

It will therefore be readily understood by those persons skilled in the art that the present invention is susceptible of a broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the invention has been described herein in detail in relation to its preferred embodiment, it is to be understood that this disclosure is only illustrative and exemplary or the present invention and is made merely for purposes of provided a full and enabling disclosure of the invention. The foregoing discussion is not intended or to be construed to limit the present invention of otherwise to exclude any such other embodiments, adaptations, variations, modifications and equivalent arrangements, the present invention being limited only by the claims appended hereto and the equivalents thereof.

I claim:

1. A switching valve for controlling the flow of fluid comprising:

a. a valve housing having opposite ends and including an inlet port, two outlet ports comprising a first and second outlet port, and an exhaust port;

b. a first valve member in said valve housing, said first valve member movable between a first position, at which said valve member blocks communication between said inlet port and said first outlet port and permits fluid flow from said inlet port to said second outlet port, and a second position, at which said inlet port is in communication with said first outlet port and at which said valve member blocks fluid flow from said inlet port to said second outlet port, said first valve member alternately blocking and permitting communication between said inlet port and said first and second outlet ports;

c. a second valve member in said valve housing, said second valve member moveable between a first position at which said valve member blocks flow between said first and second outlet ports and said exhaust port, and a second position at which at least one of said outlet ports is in communication with said exhaust port, said second valve member alternately blocking and permitting communication between said first and second outlet ports and said exhaust port;

d. wherein said second valve member is adapted to move from said first position to an intermediate position; and e. wherein said second valve member includes means for permitting a predetermined controlled flow between one of said outlet ports and said exhaust port at said intermediate position whereby the fluid flow to said exhaust port is significantly less than the fluid flow to the exhaust port at said second position for providing a controlled depressurization of said fluid.

2. The switching valve of claim 1, wherein said means for permitting a predetermined controlled flow comprises at least one orifice having a predetermined diameter for providing limited flow therethrough.

3. The switching valve of claim 2, said second valve member comprising:

a. a rod having opposite ends, a pair of exhaust pistons moveably mounted at each end of said rod, and a pair of shuttles intermediately disposed between said exhaust pistons and independently moveable relative to said exhaust pistons;

b. wherein said orifice extends through each shuttle; and c. wherein one exhaust piston and one shuttle adjacent to said one exhaust piston are correspondingly moveable between said first position at which said exhaust piston and shuttle block communication between said outlet ports and said exhaust port, and said second position at which one of said outlet ports is in communication with said exhaust port.

4. The switching valve of claim 3, wherein at the intermediate position, one of said exhaust pistons is adapted to move from said first position to said second position and said adjacent shuttle is adapted to remain in said first position whereby flow between one of said outlet ports and said exhaust port is permitted through said orifice of said shuttle.

5. The switching valve of claim 4, wherein each orifice shuttle further comprises a biasing means for urging said shuttle toward the second position at which one of said outlet ports is in communication with said exhaust port.

6. The switching valve of claim 5, wherein said biasing means comprises a spring having a predetermined biasing force for moving said shuttle to said second position.

7. The switching valve of claim 6, wherein said second valve member further comprises a spacing element having opposite ends, said spacing element being mounted on said rod between said shuttles with each end in contact with said spring of each shuttle for maintaining a predetermined distance between said shuttles.

8. The switching valve of claim 7, wherein each exhaust piston includes an outer face adjacent to one end of said valve housing and an inner face adjacent to one of said shuttles.

9. The switching valve of claim 8, wherein each shuttle includes an inner face and an outer face, said outer face being adjacent to said inner face of said exhaust piston.

10. The switching valve of claim 9, wherein each shuttle further comprises a resilient member on said inner face and said outer face which provides a seal at said valve seats when each of said shuttles is firmly seated at the first position and provides a seal at said adjacent exhaust piston when each of said shuttles is at the first position.

11. The switching valve of claim 10, wherein said valve housing includes interior recesses and further comprises a plurality of valve seats placed in said interior recesses, said value seats being specifically configured to engage said inner faces of each of said shuttles when said shuttles are at the first position.

12. The switching valve of claim 11, wherein each end of said valve housing defines a stop for engaging said outer faces of said exhaust pistons to stop movement of said exhaust pistons when the exhaust piston is at the second position.

13. The switching valve of claim 9, wherein at said intermediate position, one of said exhaust pistons moves to engage said stop while the inner face of the adjacent shuttle continues to engage said valve seats for permitting said predetermined controlled flow between one of said outlet ports and said exhaust port.

14. The switching valve of claim 13, wherein said exhaust pistons and said shuttles are moveable between said first position and said second position in response to a pressure differential thereacross and said second valve member further comprises a pressurizing means for applying a predetermined pilot air pressure.

15. The switching valve of claim 14, wherein said pilot air pressure is applied to said outer face of each exhaust piston for moving said exhaust pistons between said first position and said second position, said exhaust pistons and said shuttles moveable in response to the prevailing pressure differential thereacross and said predetermined pilot air pressure applied to said outer faces of each exhaust piston.

16. The switching valve of claim 15, wherein each exhaust piston is moveable from said first position to said second position when said pilot air pressure is applied to said outer face of said exhaust piston is reduced to atmospheric pressure for opening communication between one of said outlet ports and said exhaust port while the pressure differential across said shuttle initially holds said shuttle in the first position against said valve seats.

17. The switching valve of claim 16, wherein said shuttle moves to said second position when said spring overcomes the pressure differential holding said shuttle in said first position.

18. The switching valve of claim 3, wherein said valve housing further includes at least one drain hole for preventing flow from leaking out through said exhaust pistons.

19. A switching valve for controlling the flow of fluid comprising:

a. a valve housing having opposite ends and including an inlet port, two outlet ports comprising a first and second outlet port, and an exhaust port;

b. a first valve member in said valve housing, said first valve member movable between a first position, at which said valve member blocks communication between said inlet port and said first outlet port and permits fluid flow from said inlet port to said second outlet port, and a second position, at which said inlet port is in communication with said first outlet port and at which said valve member blocks fluid flow from said inlet port to said second outlet port, said first valve member alternately blocking and permitting communication between said inlet port and said first and second outlet ports;

c. a second valve member in said valve housing, said second valve member moveable between a first position at which said valve member blocks flow between said first and second outlet ports and said exhaust port, and a second position at which at least one of said outlet ports is in communication with said exhaust port, said second valve member alternately blocking and permitting communication between said first and second outlet ports and said exhaust port;

d. wherein said first valve member is adapted to move from said first position to an intermediate position; and e. wherein said first valve member includes means for permitting a predetermined controlled flow between said inlet port and said first and second outlet ports at the intermediate position whereby the fluid flow through said inlet port to said first and second outlet ports is significantly less than the fluid flow between the inlet port and said first and second outlet ports at the second position for providing a controlled repressurization of said fluid.

20. The switching valve of claim 19, wherein said means for providing a controlled flow comprises a passageway having a predetermined diameter, said passageway formed between said first valve member and said valve housing at said intermediate position.

21. The switching valve of claim 20, said first valve member comprising:

a. a rod having opposite ends and a pair of coaxial inlet pistons mounted at each end of said rod and being conjointly moveable back and forth between said first position and said second position; and b. wherein when one inlet piston is at said first position and blocks communication between said inlet port and said first outlet port, the other inlet piston is at said second position and allows communication between said inlet port and the second outlet port.

22. The switching valve of claim 21, wherein each inlet piston has an inner face and an outer face, said outer faces being adjacent to said opposite ends of said valve housing.

23. The switching valve of claim 22, wherein said valve housing includes interior recesses and further comprising a plurality of valve seats placed in said interior recesses, said valve seats being specifically configured to correspond to and engage said inner faces of said inlet pistons when said inlet pistons are at the first position.

24. The switching valve of claim 22, wherein each end of said valve housing defines a stop for engaging said outer faces of said inlet pistons to stop movement of said inlet pistons when each inlet piston is at the second position.

25. The switching valve of claim 24, wherein said interior recesses include a channel between said valve housing and said inlet pistons, said channel having a predetermined width.

26. The switching valve of claim 25, wherein said pistons are disposed a predetermined distance from one another and at said intermediate position said channel is formed between the inner face of the inlet piston and the corresponding valve seat.

27. The switching valve of claim 26, wherein said passageway comprises said channel and a clearance slot formed between the outer diameter of the inner face of each of said inlet pistons and the corresponding valve seat, said clearance slot being connected to said channel at said intermediate position for providing controlled flow between said inlet port and said first and second outlet ports.

28. The switching valve of claim 27, said inlet pistons further comprising a resilient member on said inner face of each inlet piston, wherein said resilient member provides a seal at said valve seats when one of said pistons is firmly seated in the first position.

29. The switching valve of claim 28, said rod including a washer assembly at each end of the rod for maintaining said inlet pistons on each end of said rod.

30. The switching valve of claim 29, wherein each inlet piston further includes a compression spring positioned between said washer assembly and the outer face of said piston.

31. The switching valve of claim 30, wherein each inlet piston further includes a resilient rod sealing member between said inlet piston and said rod for providing a seal between said inlet piston and said rod.

32. The switching valve of claim 31, each inlet piston including a drain hole for preventing flow from leaking out through said rod sealing members.

33. The switching valve of claim 27, wherein said inlet pistons are conjointly moveable between said first position and said second position in response to a pressure differential thereacross and said first valve element further comprises a pressurizing means for applying a predetermined pilot air pressure.

34. The switching valve of claim 33, wherein said pilot air pressure is applied to said outer face of each inlet piston for moving said inlet pistons between said first position and said second position, said inlet pistons moveable in response to the prevailing pressure differential thereacross and said predetermined pilot air pressure applied to said outer faces of each inlet piston.

35. The switching valve of claim 34, wherein at the intermediate position, said channel is formed in response to the prevailing pressure differential thereacross for permitting a predetermined controlled fluid flow between said inlet port and each of said first and second outlet ports through said passageway.

36. A switching valve for controlling the flow of fluid comprising:

a. a valve housing having opposite ends and including an inlet port, two outlet ports comprising a first and second outlet port, and an exhaust port;

b. a first valve member in said valve housing, said first valve member movable between a first position, at which said valve member blocks communication between said inlet port and said first outlet port and permits fluid flow from said inlet port to said second outlet port, and a second position, at which said inlet port is in communication with said first outlet port and at which said valve member blocks fluid flow from said inlet port to said second outlet port, said first valve member alternately blocking and permitting communication between said inlet port and said first and second outlet ports;

c. a second valve member in said valve housing, said second valve member moveable between a first position at which said valve member blocks flow between said first and second outlet ports and said exhaust port, and a second position at which at least one of said outlet ports is in communication with said exhaust port, said second valve member alternately blocking and permitting communication between said first and second outlet ports and said exhaust port;

d. wherein said first and second valve members are adapted to move from said first position to an intermediate position;

e. wherein said first valve member includes means for permitting a predetermined controlled flow between said inlet port and said first and second outlet ports at the intermediate position whereby the fluid flow through said inlet port to said first and second outlet ports is significantly less than the fluid flow between the inlet port and said first and second outlet ports at the second position for providing a controlled repressurization of said fluid; and f. wherein said second valve member includes means for permitting a predetermined controlled flow between one of said outlet ports and said exhaust port at said intermediate position whereby the fluid flow to said exhaust port is significantly less than the fluid flow to the exhaust port at said second position for providing a controlled depressurization of said fluid.

37. The switching valve of claim 36, wherein said means for permitting a predetermined controlled flow comprises at least one orifice having a predetermined diameter for providing limited flow therethrough for a controlled depressurization.

38. The switching valve of claim 36, wherein said means for providing a controlled flow comprises a passageway having a predetermined diameter, said passageway being formed between said valve member and said valve housing prior to said valve member moving from said first position to said second position for a controlled repressurization.

39. The switching valve of claim 36, wherein said first and second valve members are moveable between said first position and said second position in response to a pressure differential thereacross.

40. The switching valve of claim 39 and further comprising a pressurizing means for applying a predetermined pilot air pressure to said first and second valve members, said valve members being moveable in response to the prevailing pressure differential thereacross and said predetermined pilot air pressure for alternately moving said valve members between said first and second positions.

41. A pneumatically actuated switching valve for use with multi-chamber adsorbent air and gas fractionators having two adsorbent beds for controlling the flow of fluid to each bed, said switching valve comprising:

a. a valve housing having opposite ends and including an inlet valve and an exhaust valve within said valve housing, said inlet valve including an inlet port for receiving an air feed stream and two outlet ports connected to the adsorbent beds and said exhaust valve including an exhaust port connected to the adsorbent beds;

b. wherein said inlet and exhaust valves include inlet pistons and exhaust pistons moveable back and forth within the valve housing between a port open position, an intermediate position and a port obstructing position for alternately introducing the air feed stream into one of the adsorbent beds through the inlet port and one of the outlet ports while simultaneously providing communication between the other outlet port and the exhaust port for releasing exhaust flow through the exhaust valve, said pistons each having an inner pressure receiving face and an outer pressure receiving face, said pistons moveable in response to the prevailing pressure differential applied across the inner face of each piston and by a predetermined pilot air pressure applied to the outer face of each piston;

c. a pressurizing means for applying a predetermined amount of pilot air pressure to the outer face of each piston, said pressurizing means controlled by a control means to alternately placing the outlet ports and exhaust port in communication with the adsorption beds according to the application of pilot air pressure;

d. said inlet valve including means for permitting a predetermined controlled flow of fluid between said inlet port and each of said outlet ports at the intermediate position whereby the fluid flow through said inlet port to each of said outlet ports is significantly less than the fluid flow between said inlet port and each of said outlet ports at the port open position for providing a controlled repressurization of said fluid; and e. said exhaust valve member including means for permitting a predetermined controlled flow of fluid between one of said outlet ports and said exhaust port at the intermediate position whereby the flow to said exhaust port is significantly less than the flow to the exhaust port at said port open position for providing a controlled depressurization of said fluid.

42. A multi-chamber adsorbent fractionation system comprising:

a. a pair of adsorption chambers adapted for air flow therethrough and periodic cycling between an adsorption cycle and a regeneration cycle, each chamber being alternately in communication with an inlet line including a pressurized air feed stream and an exhaust line maintained at a reduced pressure and each chamber including a discharge line for discharging dried air from the chamber following the adsorption cycle;

b. control means for controlling the cycling time for switching the air flow in predetermined, periodic cycles to alternately place each of the chambers in communication with the air feed stream from the inlet line and the exhaust line for passing the air feed stream through one adsorption chamber under relatively high pressure for drying the air flow while the other chamber is simultaneously depressurized and regenerated for the next adsorption cycle;

c. a purge flow means for directing a lower pressure purge air flow from the discharge line of the chamber in the adsorbing cycle through the chamber in the regeneration cycle;

d. a pneumatically operated four way switching valve activated by the control means, said switching valve including a valve housing comprising a three way inlet valve having one air feed stream inlet port and two outlet ports, each outlet port being connected to one of said chambers and an exhaust valve having one exhaust port connected to said exhaust line, said inlet and exhaust valves including valve elements responsive to pressure differential thereacross and moveable back and forth within said valve housing between a port open, end position, an intermediate position and a port obstructing, closed position according to the pressure differential therein at various stages of the adsorption and regeneration cycles;

e. a pressurizing means for applying a predetermined amount of pilot air pressure to said switching valve, said valve elements moveable in response to the application thereto of predetermined pilot air pressure, said pressurizing means controlled by said control means to alternately place said adsorption chambers in communication with the inlet line and the exhaust line according to the application of pilot air pressure;

f. said inlet valve including means for permitting a predetermined controlled flow of fluid between said inlet port and one of said outlet ports at said intermediate position, said means comprising a passageway having a predetermined diameter, said passageway formed between said valve elements of said inlet valve and said valve housing at said intermediate position whereby the fluid flow through said inlet port to one of said outlet ports is significantly less than the fluid flow between said inlet port and said outlet port at the port open position for providing a controlled repressurization of said chambers; and g. said exhaust valve including means for permitting a predetermined controlled flow between one of said outlet ports and said exhaust port at said intermediate position, said means for providing a controlled flow comprising a passageway having a predetermined diameter, said passageway formed between said valve elements of said exhaust valve and said valve housing at said intermediate position whereby the fluid flow to said exhaust port is significantly less than the fluid flow to the exhaust port at said port open, end position for providing a controlled depressurization of each of said chambers when the exhaust valve is open and the chamber in communication with the exhaust valve is placed on the regeneration cycle.

* * * * *